(12) United States Patent
Masuda et al.

(10) Patent No.: US 8,683,606 B2
(45) Date of Patent: Mar. 25, 2014

(54) NAVIGATION SYSTEM

(75) Inventors: Hiroyoshi Masuda, Nagoya (JP);
Kensuke Takeuchi, Okazaki (JP);
Norihisa Fujikawa, Okazaki (JP);
Koichi Iwatsuki, Okazaki (JP);
Yoshihiro Tanabe, Kota (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/519,086

(22) PCT Filed: Jan. 7, 2011

(86) PCT No.: PCT/JP2011/050609
§ 371 (c)(1),
(2), (4) Date: Jun. 25, 2012

(87) PCT Pub. No.: WO2011/102163
PCT Pub. Date: Aug. 25, 2011

(65) Prior Publication Data
US 2012/0291134 A1    Nov. 15, 2012

(30) Foreign Application Priority Data

Feb. 19, 2010  (JP) ................................ 2010-035320

(51) Int. Cl.
| G06F 7/04 | (2006.01) |
| G08B 21/00 | (2006.01) |
| H04L 9/32 | (2006.01) |
| G06F 12/14 | (2006.01) |
| G06F 17/00 | (2006.01) |

(52) U.S. Cl.
USPC .............. 726/26; 726/34; 713/168; 713/179; 713/181; 713/189; 701/450; 701/451; 701/452; 701/453; 701/486; 707/694; 707/698

(58) Field of Classification Search
USPC .............. 726/26, 34; 713/168, 179, 181, 189; 707/694, 698; 701/450–453, 486
See application file for complete search history.

(56) References Cited

U.S. PATENT DOCUMENTS

| 7,613,917 | B1 | 11/2009 | Chojnacki |
| 2002/0087263 | A1 | 7/2002 | Wiener |

(Continued)

FOREIGN PATENT DOCUMENTS

| EP | 2 098 825 A2 | 9/2009 |
| EP | 2 113 860 A1 | 11/2009 |
| JP | A-2005-331579 | 12/2005 |
| WO | WO 2008/088063 A1 | 7/2008 |

OTHER PUBLICATIONS

International Search Report issued in Application No. PCT/JP2011/050609; Dated May 30, 2011.

(Continued)

*Primary Examiner* — Aravind Moorthy
(74) *Attorney, Agent, or Firm* — Oliff PLC (57) ABSTRACT

At the first data access by a navigation unit to a recording medium that records updating right information necessary for updating map data in a rewritable data area in which map data are recorded, the updating right information is read from the data area and is deleted from the data area, and a map updating due date created based on the read updating right information is written in a memory of the navigation unit together with the medium identification information read from a non-rewritable management area.

7 Claims, 8 Drawing Sheets

(56) References Cited

U.S. PATENT DOCUMENTS

2003/0084313 A1     5/2003   Tada
2004/0193364 A1*    9/2004   Chojnacki .................... 701/200
2005/0210249 A1     9/2005   Lee et al.
2007/0300052 A1    12/2007   Jevans
2009/0228194 A1*    9/2009   Imasaka et al. ............... 701/200
2012/0047566 A1*    2/2012   Andersson ....................... 726/7

OTHER PUBLICATIONS

Russian Patent Office, Notification on Patentability Examination Results mailed Jun. 27, 2013 in Russian Patent Application No. 2012126109 w/English-language Translation.

* cited by examiner

NAVIGATION SYSTEM

FIELD OF THE INVENTION

The present invention relates to a navigation system having a navigation unit operating using map data and a recording medium attachable to and detachable from the navigation unit, in which the recording medium has a rewritable data area in which the map data are recorded and a non-rewritable management area in which medium identification information is recorded.

DESCRIPTION OF THE RELATED ART

In recent years, navigation units in which map data are stored in a recording medium such as a flash memory of which capacity is increasing, particularly car navigation units mounted in an automobile are appearing. Further, road situations are changing constantly due to construction of new roads, urban development, and the like. Accordingly, it is desired that map data used in a navigation unit be updated constantly. For this updating, since the recording medium such as a flash memory as described above is attachable to and detachable from the navigation unit, a structure to update the map data recorded in such a recording medium does not require removal of the navigation unit or the memory of the navigation unit from the automobile and thus facilitates updating. However, generally, data recorded in the recording medium such as a flash memory can be copied easily, which allows an unauthorized act such that a user receives an illegal recording medium which is illegally copied from a legitimate recording medium purchased by another user, and updates the map data used in a navigation unit of this user.

There has been proposed a map data updating system preventing unauthorized acts through illegal copying of a recording medium as described above (see, for example, Japanese Patent Application Publication No. JP-A-2005-331579 (paragraphs [0002] to [0010], FIG. 1). In this map data updating system, map data for updating distributed from a map data distribution center (hereinafter simply referred to as a center) are written in a recording medium, and this recording medium is used to update map data in an on-vehicle navigation apparatus. In the system, a unique individual ID assigned to the navigation apparatus as attribute data is added to the map data for updating written in the recording medium. The navigation apparatus is provided with a determining unit determining whether the individual ID assigned to the navigation apparatus and the individual ID added to the map data for updating match each other, and a prohibiting unit prohibiting use of the map data for updating written in the recording medium when the determining unit determines that the individual IDs do not match each other.

Since the unique individual ID assigned to the navigation apparatus is added as attribute data in the recording medium, the determining unit determines whether the individual ID assigned to the navigation apparatus and the individual ID recorded in the recording medium match or not when the recording medium is used in the navigation apparatus. When the individual IDs do not match, the prohibiting unit prohibits use of the map data for updating written in this recording medium. This is intended to prevent unauthorized use of map data for updating.

SUMMARY OF THE INVENTION

In the map data updating system according to Japanese Patent Application Publication No. JP-A-2005-331579, when the individual ID assigned to the navigation apparatus is read in advance from the navigation apparatus or the recording medium used in this apparatus, and if this user writes the individual ID of his/her navigation apparatus, which is read in advance as the individual ID, in the recording medium in which illegally copied map data are recorded, this recording medium is recognized as legitimate. Therefore, an unauthorized act with the map data for updating can be performed relatively easily.

In view of the above-described situation, it is an object of the present invention to provide a technique for implementing security measures for map data more robustly in a navigation system using map data recorded in a rewritable recording medium, such as a flash memory card.

For achieving the above-described object, in a navigation system having a navigation unit operating using map data and a recording medium attachable to and detachable from the navigation unit, in which the recording medium has a rewritable data area in which the map data are recorded and a non-rewritable management area in which medium identification information (generally an ID code called CID) is recorded, updating right information necessary for updating the map data is recorded in the data area, and the updating right information is read from the data area and deleted from the data area at the first data access to the recording medium by the navigation unit, and a map updating due date created based on the read updating right information is written in a memory of the navigation unit together with medium identification information read from the management area.

In this structure, during the first data access that has occurred between the navigation unit and the recording medium, updating right information recorded in the recording medium is read and deleted, and a map updating due date created based on the updating right information and medium identification information of the recording medium are written in the memory of the navigation unit. That is, during the first data access to one recording medium by the navigation unit, not only the medium identification information of this recording medium but also the updating due date and the updating right information of recorded map data are written in the navigation unit. Particularly, this updating right information is deleted from the recording medium after being read, and no longer remains in the recording medium. Thus, the updating right information is not copied even if the recording medium after completion of the data access is illegally copied, and it is impossible to reproduce the original legitimate recording medium. By employing such a structure with respect to the first data access to the recording medium, the navigation unit is able to realize map data updating having more robust security using the updating right information and the updating due date, which are written in the memory of the navigation unit.

In order to further improve the security, in one preferred embodiment of the present invention, the recording medium has a password lock function which is initially in a locked state, and the navigation unit includes a password for releasing the password lock so that the password is sendable to the recording medium. In this structure, a password lock is provided in the recording medium for allowing access by a password that is possessed only by the navigation unit. Thus, this recording medium first needs be inserted in the corresponding navigation unit and subject to data access. Accordingly, unauthorized acts such as copying whole data of the recording medium before being used (before the first data access) can be prevented. After data access is performed by the navigation unit, the password lock is released but illegal copying is prevented because the updating right information is deleted by this time as described above. Therefore, this structure can prevent unauthorized acts regardless of whether it is before or after data access to the recording medium. After the password lock function is released, data access while the recording medium is inserted in a different apparatus, for example, a personal computer of the user, becomes possible, and thus map data for updating can be written via the personal computer.

Preferably, the timing to release the password lock function from the recording medium is after deletion of the updating right information from the data area of the recording medium. This is because when the password lock function is released before the updating right information is deleted, there is a possibility that the recording medium is pulled out of the navigation unit at this time point, and the updating right information is illegally read.

In a further preferred embodiment, the updating right information read from the data area of the recording medium is recorded in the memory of the navigation unit. The map updating due date created based on this updating right information is recorded in the navigation unit, and the updating right information which is the source of the map updating due date is also recorded as it is in the navigation unit. Consequently, the navigation unit records all of the updating right information, the medium identification information, and the map data of the recording medium from which the map data are read, and thus recovery processing of this recording medium is possible when necessary.

In another preferred embodiment, medium identification information of the recording medium that is subject to the first data access by the navigation unit is recorded in the memory of the navigation unit as first-used medium identification information, and the map updating due date differs between the recording medium having the medium identification information recorded as the first-used medium identification information and other recording media. According to this characteristic structure, the navigation unit is able to have an advantage that enables the navigation unit to distinguish between a recording medium to which the first data access is performed in one navigation unit and other recording media to which data access is performed thereafter. Thus, it is possible to make the updating due date of the map data differ between the first recording medium and other recording media. Accordingly, for example, a period during which the map data can be updated in the first recording medium is set as three years, and a period during which the map data can be updated in other recording media, that is, in the recording media that are subsequently used, is set as two years. This is convenient for the case of vehicle inspection in which, in the case of purchasing a new vehicle, the first vehicle inspection period is set to three years and a subsequent vehicle inspection period is set to two years, because the recording medium for updating the map data can be issued at every vehicle inspection. In this case, the navigation unit may designate a predetermined period from the time of reading the updating right information as the map updating due date for the updating right information.

In a data flow in which updating map data is sent from an external unit to a terminal with a communication function, such as a personal computer, via a legitimate route and are recorded in a recording medium, and this recording medium is inserted in the navigation unit and the updating map data are written in the navigation unit, there is a possibility that map data is unexpectedly rewritten. There is also a possibility that this rewriting is performed with a malicious intention. In order to address such problems, in one preferred embodiment of the present invention, when the map data are updated, updating map data sent from an external unit are recorded in the data area of the recording medium, and a hash value generated from the updating map data is recorded as map security data in the recording medium. In this structure, whether legitimate map data are received or not can be checked through verification of hash values, and the above-described problems can be addressed.

DETAILED DESCRIPTION OF THE EMBODIMENTS

Figure 1:
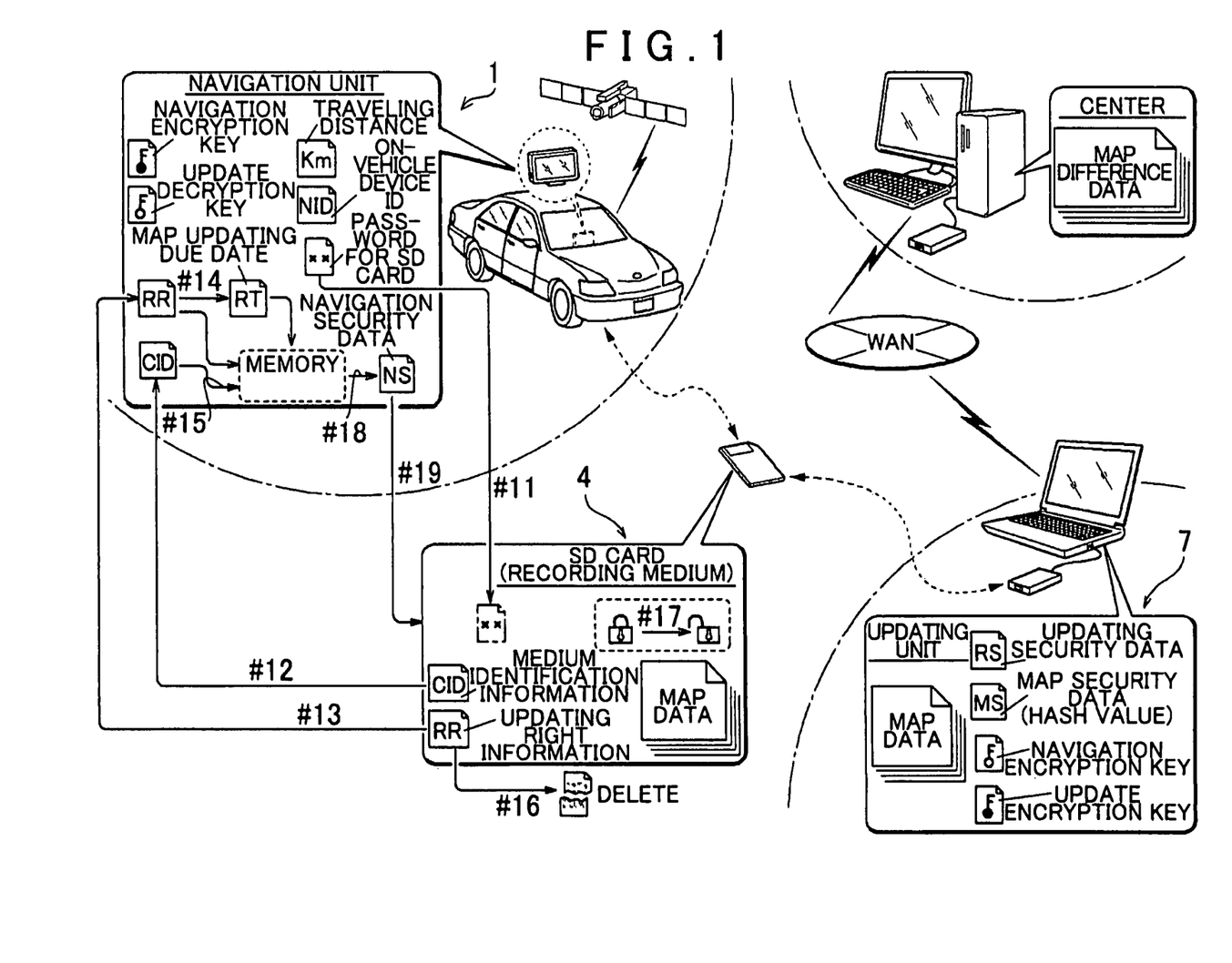
FIG. 1 is a schematic diagram illustrating a basic structure and flows of data of a navigation system according to the present invention.

Hereinafter, an embodiment of a navigation system according to the present invention will be described using the drawings. The navigation system illustrated in FIG. 1 is a car navigation system, and is made up of a navigation unit (hereinafter simply abbreviated to "navi unit") 1 mounted in an automobile, a recording medium 4 which is an SD card (more specifically, an SD memory card or SDHC memory card) in this embodiment, and an updating unit 7 which is generally a personal computer with a communication function (hereinafter simply abbreviated to "personal computer"). Map data used in the navi unit 1 are recorded in the SD card 4, and the SD card 4 is inserted in the navi unit 1 when the car navigation is used. The map data recorded in the SD card 4 are updatable. Updating the map data is performed such that map data for updating or map difference data (hereinafter, the both will be simply referred to as map data except when distinction therebetween is particularly necessary) are downloaded to the updating unit (personal computer) 7 via a WAN such as the Internet from a map center which handles the map data, and the map data in the SD card 4 are rewritten by latest data through this updating unit 7. When an automobile equipped with the navi unit 1 is purchased, or when only the navi unit 1 is purchased separately, the SD card 4 in which latest map data are recorded comes with this navi unit 1.

As basic flows of data of the navigation system according to the present invention, flows of data will be described below using FIG. 1 for the case where the SD card 4 is inserted for the first time in the nay unit 1 mounted in a vehicle. This SD card 4 includes, as memory areas, a rewritable data area and a non-rewritable management area in which medium identification information (here, CID (Card Identification register) is used) is recorded. The map data are recorded in the data area Further, updating right information including an updating final due date as information related to the right of updating the recorded map data, and so on is also written in the data area This SD card 4 has a password lock function. When this password lock function is ON, writing to this SD card 4 would not be permitted unless a predetermined password is provided thereto.

In the navi unit 1, initially there are registered, as data related to security, an on-vehicle device ID which is identification information of this navi unit 1, a password for releasing the password lock of the SD card 4 that comes with the navi unit, a navigation encryption key which is an encryption key for encrypting data in this navi unit 1, and an update decryption key for decrypting the encrypted data in the updating unit 7. In the updating unit 7, there are registered an update encryption key which is an encryption key for encrypting data in this updating unit 7 and a navigation decryption key for decrypting data encrypted in the navi unit 1 by activating a predetermined program for building the updating unit on the computer as a mother unit of the updating unit 7. The relation between the corresponding encryption key and decryption key here is substantially the same as the relation between a secret key and a public key which are publicly known, and data encrypted with the encryption key can be decrypted only with the corresponding decryption key. Further, it is practically impossible to create the corresponding decryption key from the encryption key and create the corresponding encryption key from the decryption key.

The updating unit 1 also includes a function to generate map security data constituted of a hash value calculated from map data for updating downloaded from a center, a function to generate updating security data including medium identification information of an SD card, which is a destination of transferring map data, and a hash value calculated further from the map security data, and so on, details of which will be described later.

First, when the SD card 4 is inserted in the navi unit 1, the password for releasing the lock is sent from the navi unit 1, thereby allowing the navi unit 1 to exchange data with the SD card 4 (#11). Next, the medium identification information (#12) and the updating right information (#13) are sent from the SD card 4 to the navi unit 1. The navi unit 1 records a map updating due date created from the received updating right information (#14), other data included in the updating right information, and further the updating right information in a memory of this navi unit 1 (#15). In doing so, the medium identification information is also recorded in the memory of the navi unit 1.

When the updating right information is sent from the SD card 4 to the navi unit 1, the updating right information recorded in the SD card 4 is deleted (#16). Further, the password lock function of the SD card 4 is released (#17), and thereafter, data access to this SD card 4 is permitted without the password, which improves the convenience of this card. Even after the data access without the password is permitted, the updating right information would not be pulled out of this SD card 4 because the updating right information is already deleted. Moreover, common data which can be obtained by the navi unit 1 and the SD card 4 are grouped as navigation security data (#18), encrypted with the navigation encryption key, and thereafter sent to the SD card 4 (#19). The sent navigation security data are recorded in the data area of the SD card 4.

Figure 2:
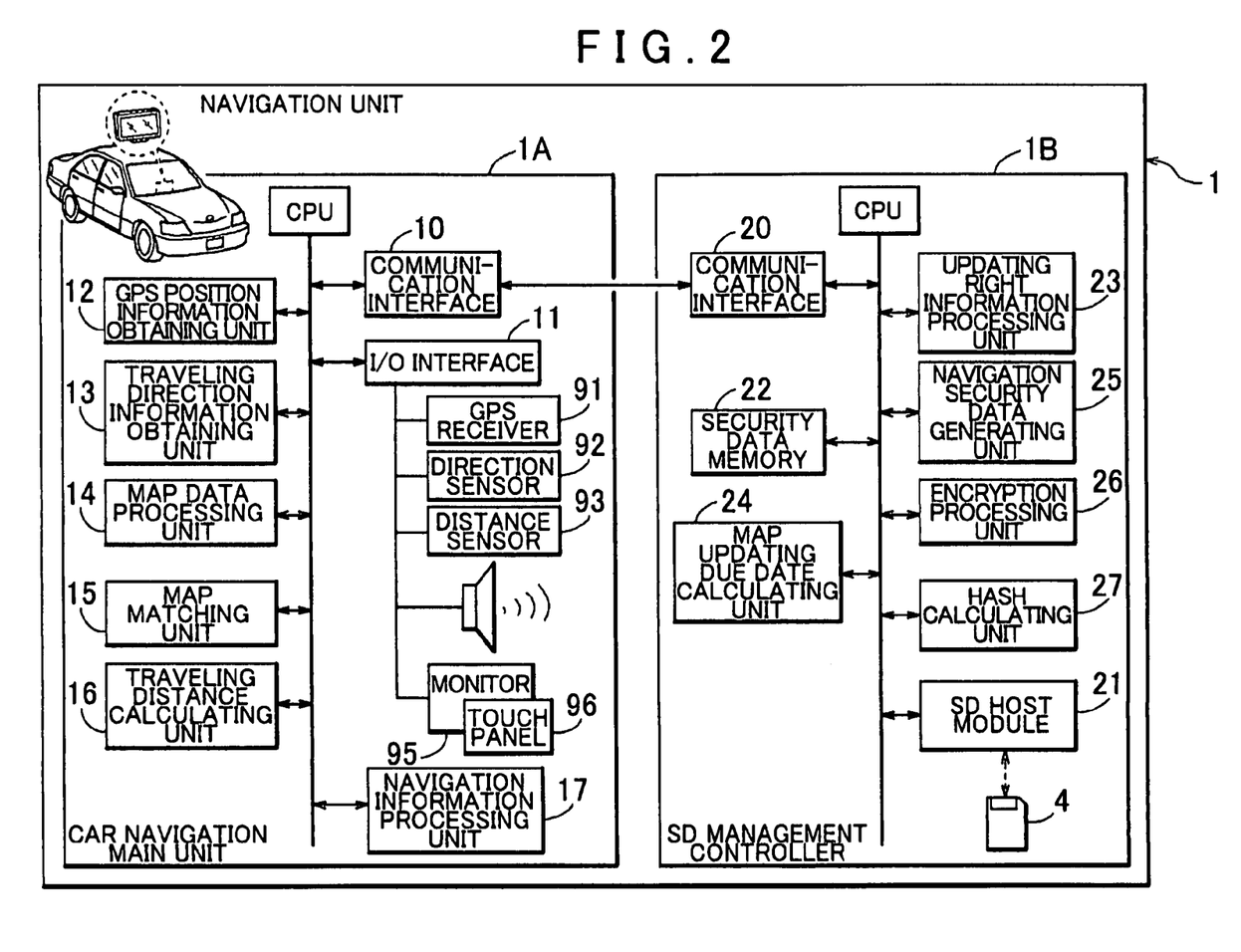
FIG. 2 is a functional block diagram illustrating functions of a navigation unit constituting the navigation system according to the present invention.

Next, details of the above-described navigation system will be described. FIG. 2 is a functional block diagram illustrating main functions of the navi unit 1. The navi unit 1 is basically made up of a car navigation main part 1A and an SD management controller 1B as a recording medium management controller connected to the car navigation main unit 1A.

The car navigation main unit 1A is connected to various car navigation sensors and input/output devices via an I/O interface 11, similarly to a general car navigation apparatus. The car navigation sensors include a global positioning system (GPS) receiver 91 receiving a GPS signal from a GPS satellite, a direction sensor 92 detecting a traveling direction of the vehicle or a change in the traveling direction, a distance sensor 93 detecting a vehicle speed and a moving distance of the vehicle, and so on. The input/output devices include a speaker 94 and a monitor 95 for giving route guidance or the like to the driver, and further an operation device such as a touch panel 96.

In the car navigation main unit 1A, main functional units built by hardware or software (program) or by both are a GPS position information obtaining unit 12, a traveling direction information obtaining unit 13, a map data processing unit 14, a map matching unit 15, a traveling distance calculating unit 16, and a navigation information processing unit. A map database which is a target of search and extraction of map data by the map data processing unit 14 is built in the SD card 4 inserted in the navi unit 1.

The GPS position information obtaining unit 12 has a function to obtain vehicle position information representing the position of the vehicle by GPS positioning. In the GPS position information obtaining unit 12, a signal from a GPS satellite received in the GPS receiver 91 can be analyzed to obtain the current position (coordinate positions: latitude and longitude) of the vehicle. The traveling direction information obtaining unit 13 has a function to obtain traveling direction information representing a traveling direction of the vehicle by a direction change amount and a moving distance of the vehicle. For this purpose, the traveling direction information obtaining unit 13 is connected to the direction sensor 92 and the distance sensor 93. The distance sensor 93 is for detecting the vehicle speed and the traveling distance of the vehicle, and based on a signal of this sensor, the total traveling distance is calculated by the traveling distance calculating unit 16. The map matching unit 15 has a function to obtain map data in the vicinity of the vehicle position from the SD card 4, and perform publicly known map matching based on the obtained map data By this map matching, there is performed a search for a shortest position from the current position of the vehicle on a road shown in map information by the vehicle position information outputted from the GPS position information obtaining unit 12 and/or the traveling direction information outputted from the traveling direction information obtaining unit 13. The found position is a vehicle on-road position, and this vehicle on-road position is displayed in a superposed manner on the road map on the monitor 6. The navigation information processing unit 17 creates navigation functions such as displaying the vehicle position, a route search from a place of departure to a destination, route guidance to a destination, and destination search. For example, the navigation information processing unit 17 obtains the map data from the SD card 4 based on the vehicle on-road position as the vehicle position determined by the map matching unit 15 and displays the image of a map on a display screen of the monitor 6, and displays a vehicle position mark representing the current position and traveling direction of the vehicle in a superposed manner on the image of the map. The navigation information processing unit 17 performs a route search from a predetermined place of departure to a destination based on the map data, and gives route guidance to the driver using one or both of the monitor 95 and the speaker 94 based on the found route from the place of departure to the destination and the vehicle position. The touch panel 96 functioning as an operation device is attached to the monitor 95, but operation switches and/or operation buttons other than the touch panel may be added as operation devices.

Main functional units of the SD management controller 1B connected to the car navigation main unit IA via their respective communication interfaces 10, 20 are an SD host module 21, a security data memory 22, an updating right information processing unit 23, a map updating due date calculating unit 24, a navigation security data generating unit 25, and an encryption processing unit 26.

The SD host module 21 performs data exchange with the SD card 4. The security memory 22 is for recording information, such as an on-vehicle device ID, which is originally inherent to the navi unit 1, and data related to security obtained from the SD card 4, such as the medium identification information (CID). The medium identification information of the SD card 4 that is the first target of data access by the navi unit 1 is recorded in the memory as first-used medium identification information. That is, the first-used medium identification information is the medium identification information of the SD card 4 inserted for the first time in the navi unit 1 that is unused. The updating right information processing unit 23 generates navi-unit-side updating right information by adding a map updating due date generated based on the updating right information obtained from the SD card, and the like, and takes out necessary data from this updating right information. The map updating due date calculating unit 24 calculates a due date with respect to updating of the map data in the inserted SD card 4. Here, the map updating due date calculating unit 24 compares the first-used medium identification information with the medium identification information of the SD card 4, and sets different map updating due dates for the SD card 4 having the medium identification information recorded as the first-used medium identification information and for other SD cards 4. Specifically, an updating due date of three years is given to the SD card 4 having the medium identification information recorded as the first-used medium identification information, and an updating due date of two years is given to the other SD cards 4. When the map data recorded in the SD card 4 is too old, this can cause various problems such as a difficulty of map updating using differences. Thus, when the map updating due date is set, the map updating due date calculating unit 24 refers to the updating final due date, and does not give the updating due date to the SD card 4 which has passed the updating final due date. For example, the updating final due date is set with reference to the time of recording the map data in the SD card 4.

The navigation security data generating unit 25 generates the navigation security data by combining security data for detecting the SD card 4 in which unauthorized map updating is performed with the updating unit 7. The navigation security data include at least the medium identification information (CID) read from the management area of the SD card 4 and information of the map updating due date. The encryption processing unit 26 includes the navigation encryption key as an encryption key for encrypting data here and the update decryption key for decrypting the encrypted data in the updating unit 7. A hash calculating unit 27 calculates the hash value of the map data of the inserted SD card 4.

Figure 3:
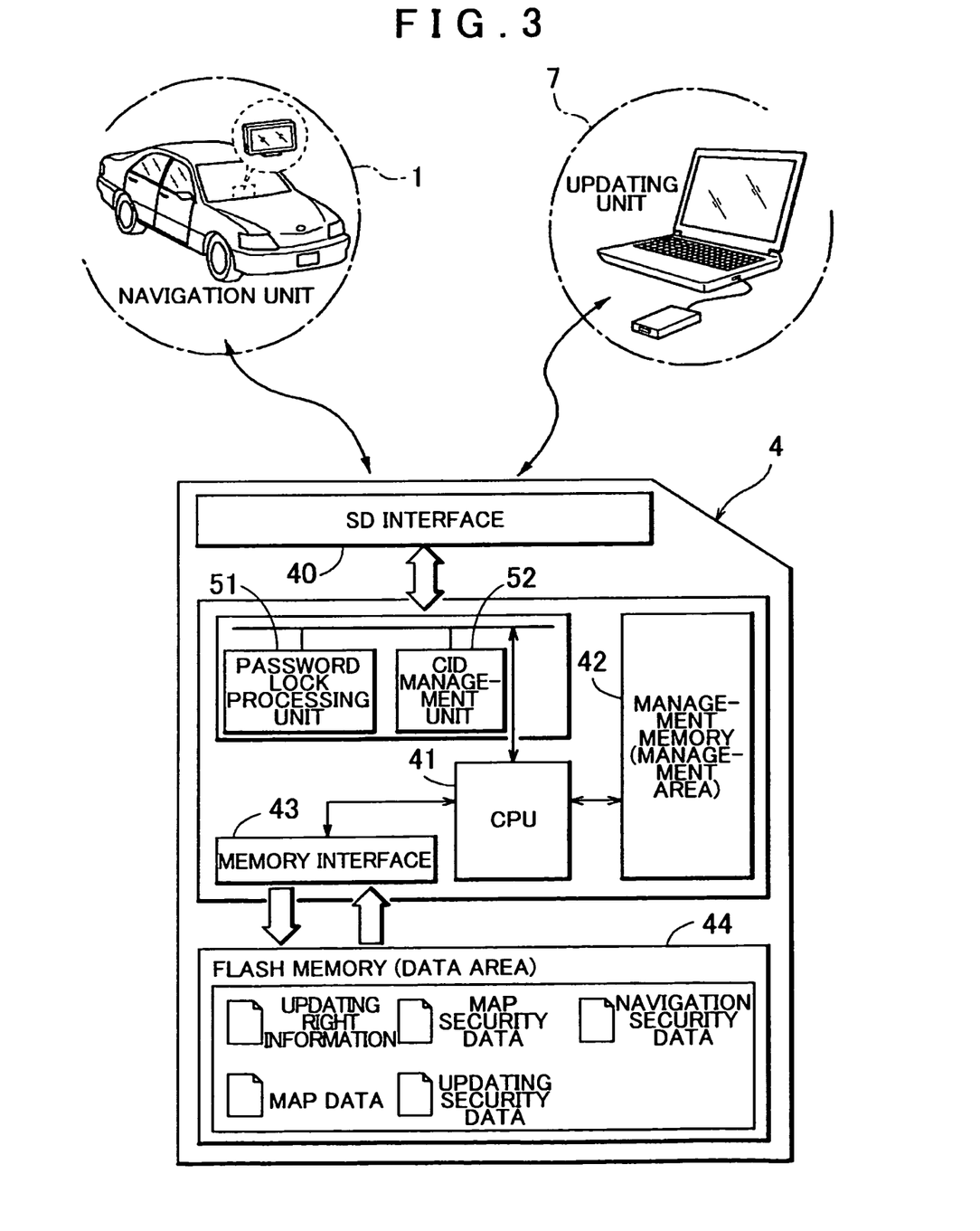
FIG. 3 is a functional block diagram illustrating functions of a recording medium constituting the navigation system according to the present invention.

As illustrated in FIG. 3, the structure of the SD card 4 is substantially the same as an SD card which is a commercially available flash memory with a security function, and is capable of exchanging data with the updating unit 7 and the navi unit 1 via an SD interface 40. The SD card includes, as basic components, a CPU 41, a management memory 42 in which the medium identification information and the like are recorded, and a flash memory 44 which is a data area in which data can be recorded in a rewritable manner via a memory interface 43. Further, the SD card also includes a password lock processing unit 55 and a CID management unit 56 as functional units achieved by a program or the like mounted for this navigation system.

The password lock processing unit 55 performs a password lock function of this SD card 4. This password lock is released after a password check is performed when the SD card is inserted for the first time in the navi unit 1, and thereafter data access is permitted without the password. The CID management unit 56 reads the medium identification information (generally a code called CID) recorded in the management memory 42 as requested, and sends the read information to the requester.

Figure 4:
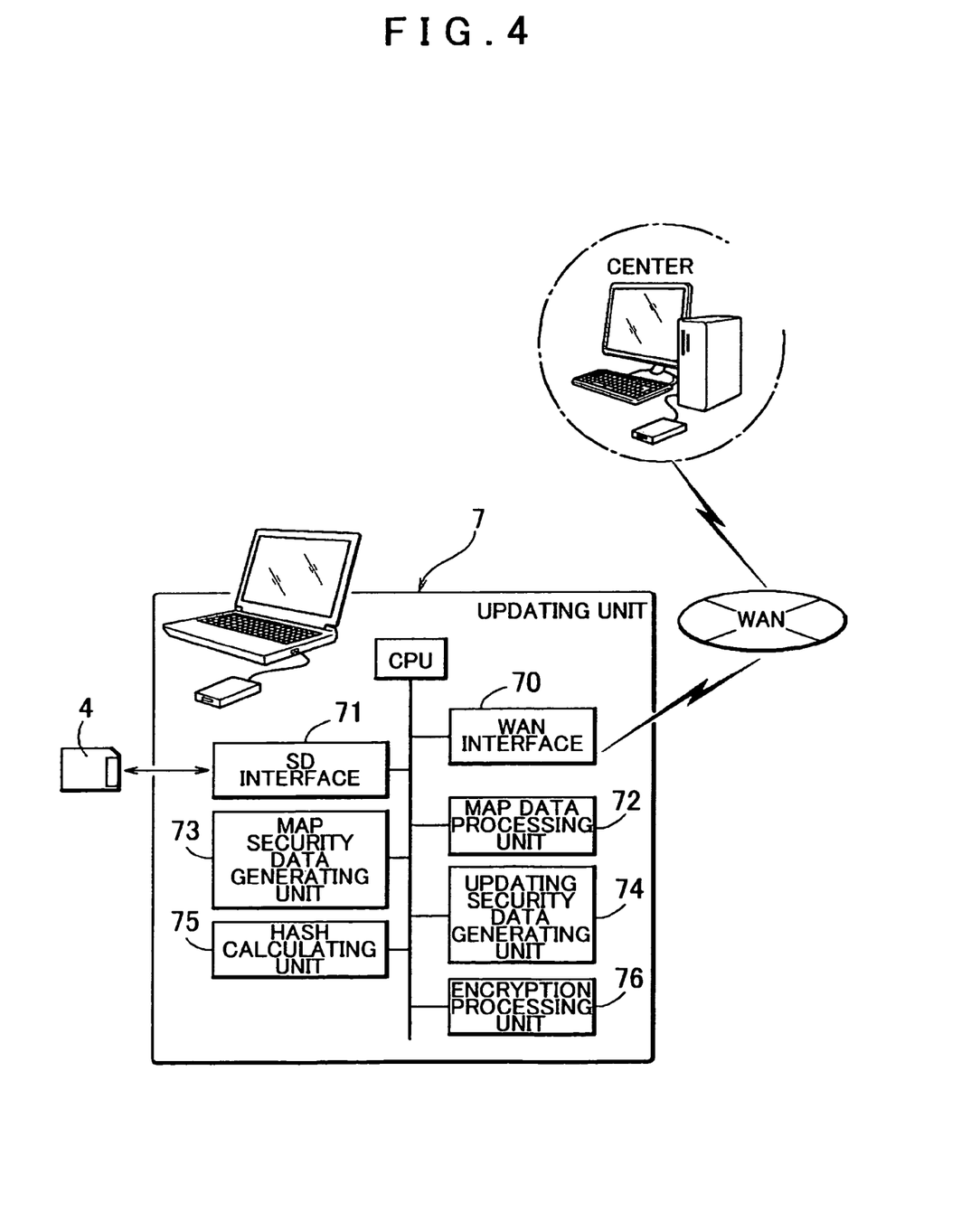
FIG. 4 is a functional block diagram illustrating functions of an updating unit constituting the navigation system according to the present invention.

As illustrated in FIG. 4, in a personal computer capable of connecting to a WAN (the Internet) via a WAN interface and also capable of exchanging data with the SD card via an SD interface 71, functional units required in the updating unit 7 are built by executing a program which achieves functions required in this navigation system. The functional units include a map data processing unit 72, a map security data generating unit 73, an updating security data generating unit 74, a hash calculating unit 75, and an encryption processing unit 76.

The map data processing unit 72 processes map data for updating (including map data attribute values such as a map data version and a map creation date) which are downloaded from the center, and updates the map data of the inserted SD card 4. Generally, the map data for updating are downloaded as difference data, and thus only data parts to be updated in the map data are rewritten using the difference data. The map data are sectioned into a plurality of map sub-data for facilitating handling. In order to allow usage as an identification code of map data to be transferred to the inserted SD card 4, the map security data generating unit 73 groups hash values obtained respectively from the map sub-data by the hash calculating unit to make the map security data. The updating security data generating unit 74 creates the updating security data by grouping the medium identification information read from the navigation security data recorded in the inserted SD card, the map creation date or the date of creating the updating map data from the difference data, and a hash value calculated again by the hash calculating unit from the map security data generated by the map security data generating unit 73. The updating security data are encrypted with the update encryption key by the encryption processing unit 76, and sent to the SD card 4. The encryption processing unit 76 also includes the navigation decryption key for decrypting data encrypted with the navigation encryption key in the encryption processing unit 26 of the navi unit 1. Accordingly, the updating unit 7 is capable of reading the navigation security data encrypted with the navigation encryption key from the SD card 4 and decrypting the read navigation security data.

In the navigation system structured as described above, when the map data are transferred between the navi unit 1 and the SD card 4 and the updating unit 7, various information or data are exchanged for the purpose of security. FIG. 5A to FIG. 5E illustrate an overview of data structures of such data and information.

Figure 5A:
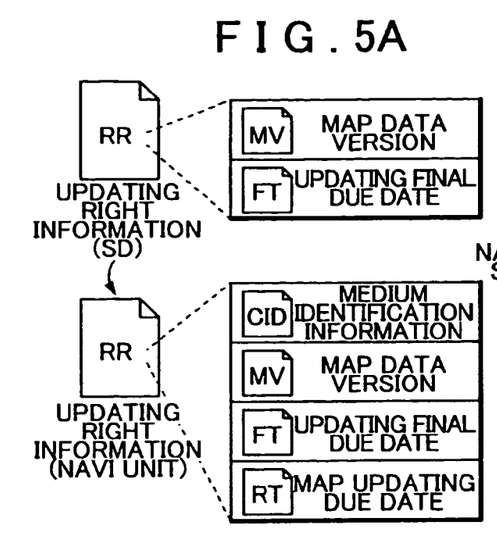
FIG. 5A to FIG. 5E are data structure diagrams of updating right information transferred from the recording medium to the navigation system.

The structure of the updating right information illustrated in FIG. 5A differs between when being recorded in the SD card 4 and when being transferred thereafter to the navi unit 1 and recorded therein. Specifically, the updating right information in the SD card 4 has a map data version and an updating final due date. On the other hand, in the updating right information in the navi unit 1, the medium identification information (CID) and the map updating due date calculated in the map updating due date calculating unit 24 of the navi unit 1 are further added.

Figure 5B:
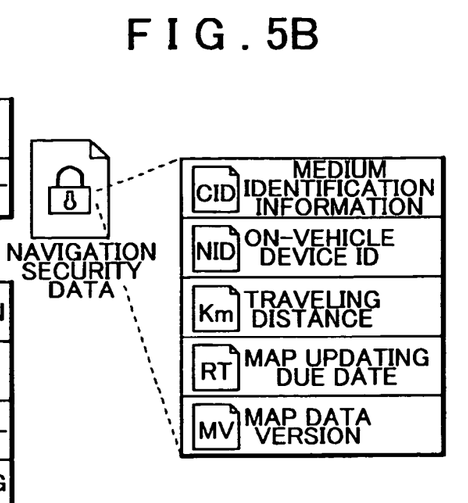

The navigation security data illustrated in FIG. 5B are generated in the navi unit 1, and have the medium identification information, the on-vehicle device ID, the traveling distance, the map updating due date, and the map data version. The navigation security data are encrypted with the navigation encryption key and transferred from the navi unit 1 to the SD card 4.

Figure 5C:
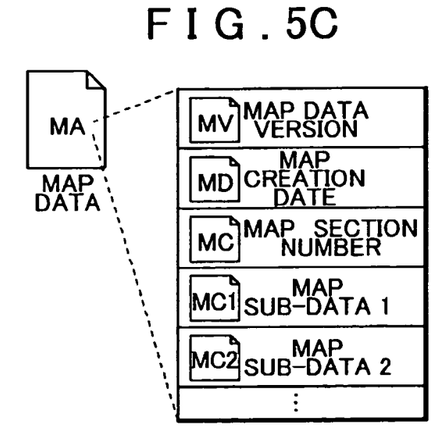

The map data illustrated in FIG. 5C are set up finally in the updating unit 7, and have a map data version and a map creation date as attribute values of map data together with the plurality of map sub-data 1, and so on sectioned by a map section number.

Figure 5D:
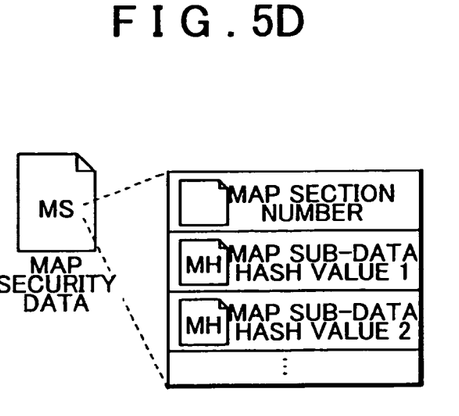
Figure 5E:
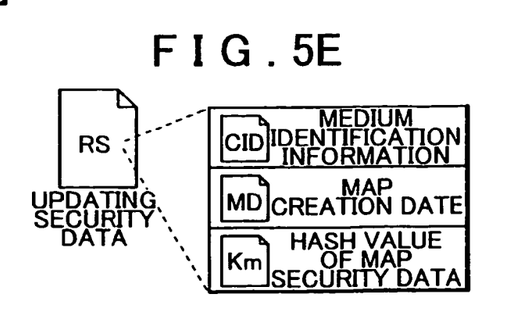

The map security data illustrated in FIG. 5D are generated in the updating unit 7, and include hash values of map sub-data calculated respectively for the plurality of map sub-data sectioned by the map section number as a map sub-data hash value 1, and so on. The map security data are transferred from the updating unit 7 to the SD card 4 together with the map data. The updating security data illustrated in FIG. 5E are generated in the updating unit 7, and include the medium identification information read from the navigation security data recorded in the SD card 4, and hash values of the map security data which are second-level hash values obtained by further hash-calculating a plurality of map sub-data hash values included in the map security data. The updating security data are encrypted with the update encryption key and transferred to the inserted SD card 4.

Figure 6:
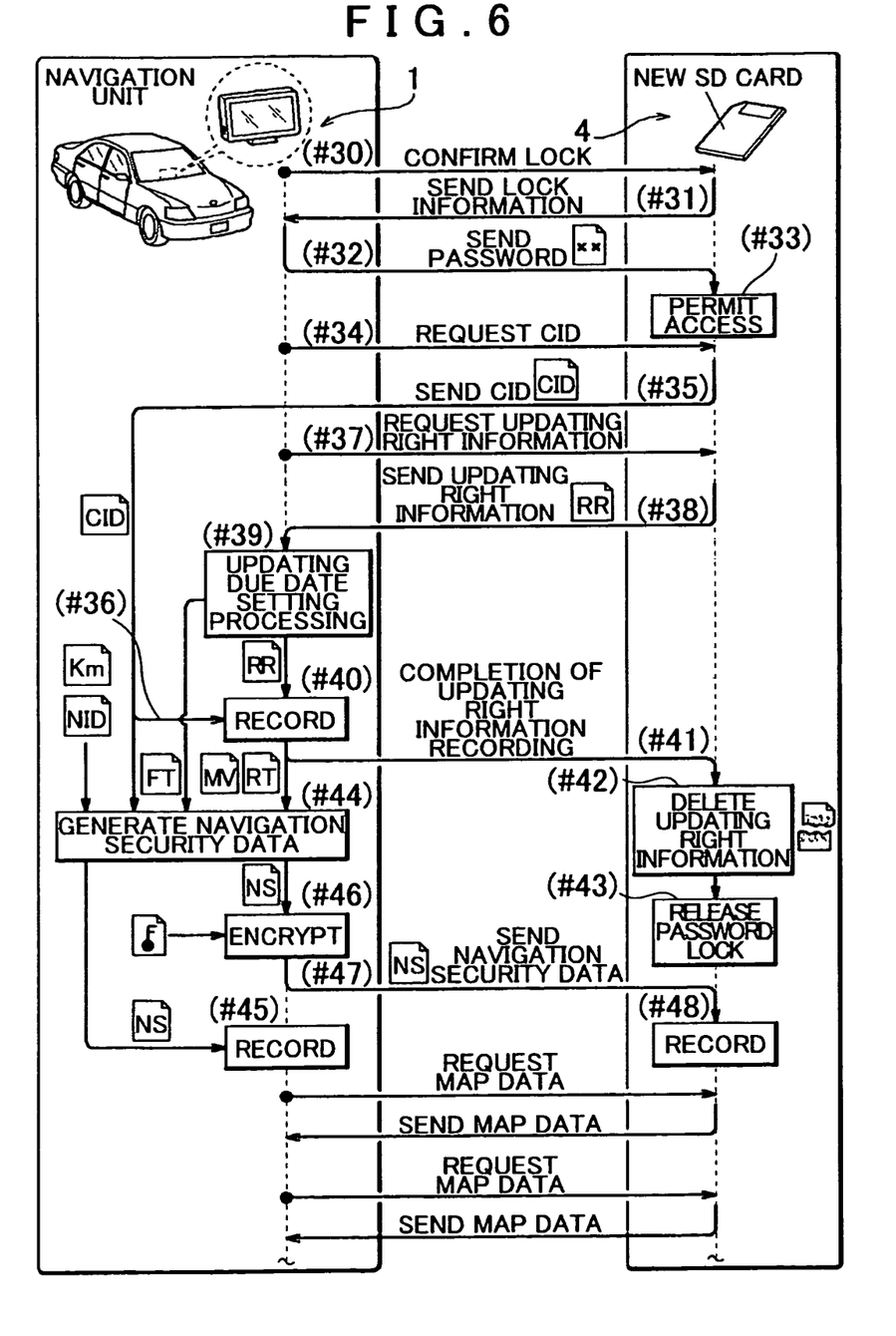
FIG. 6 is a diagram schematically illustrating data exchange between the navi unit and an SD card at the time of first use.

Next, procedures of data exchange in this navigation system will be described. FIG. 6 is a diagram schematically illustrating data exchange between the navi unit 1 and the SD card 4 when the navi unit 1 is mounted in an automobile and the SD card 4 is inserted for the first time.

First, the navi unit 1 performs lock confirmation with respect to the SD card 4 (#30). Upon reception of lock information indicating that the password lock is functioning from the SD card 4 (#31), the navi unit 1 sends a password (#32). When the password is sent from the navi unit 1, data access to the SD card 4 is permitted (#33). When data access is permitted, the navi unit 1 requests the medium identification information (CID) recorded in the management area from the SD card 4 (#34). Upon reception of the medium identification information (CID) (#35), the navi unit 1 records the information temporarily in the memory 22 (#36). Further, the navi unit 1 requests the updating right information (RR) (#37), and upon reception of the updating right information (RR) (#38), the map updating due date calculating unit 24 calculates the map updating due date based on the updating information (RR) (#39). In this embodiment, on the condition that the updating right information (RR) is recorded in the SD card 4, the map updating due date calculating unit 24 designates a predetermined period from the time of reading this updating right information (RR) as the map updating due date for this updating right information (RR). Here, as described above, the map updating due date calculating unit 24 gives a different map updating due date depending on whether it is the SD card 4 that is the first target of data access by the navi unit 1 or not. Specifically, the updating due date of three years is given to the SD card 4 that is the first one for this navi unit, and the updating due date of two years is given to the SD card 4 that is the second or later one. At this time, the map updating due date calculating unit 24 checks the updating final due date included in the updating right information (RR), and does not give the updating due date to the SD card 4 which has passed the updating final due date. Next, based on data recorded in the memory 22, the updating right information processing unit 23 creates the updating right information (RR) having the data structure illustrated in FIG. 5, and records the created information in the memory 22 (#40). When the re-creation and recording of the updating right information (RR) are completed, completion of the updating right information recording is notified to the SD card 4 (#41), and accordingly, the updating information management unit 52 deletes the updating right information recorded in the flash memory 44 (#42). Subsequently, the password lock processing unit 55 releases the password lock function (#43).

In the navi unit 1, the navigation security data generating unit 25 groups the medium identification information (CID) read from the management memory 42 as the management area of the inserted SD card 4, the on-vehicle device ID (NID) inherent to this navi unit 1, the traveling distance (Km) obtained from the car navigation main unit 1A, the map updating information (RT) calculated in advance, and the map database version (MV) included in the updating right information (RR) to thereby create the navigation security data (NS) (#44), and records the created data in the memory 22 (#45). Further, the navigation security data (NS) is encrypted using the navigation encryption key by the encryption processing unit 26 (#46), sent to the SD card 4 (#47), and recorded in the flash memory 44 as the data area (#48).

Thus, the initial processing of the navi unit 1 and the SD card 4 is completed. During car navigation processing, the SD management controller 1B repeats processing of accessing the SD card 4, reading necessary map data from the SD card 4, and giving the read data to the car navigation main unit 1A, as requested by the car navigation main unit 1A.

Figure 7:
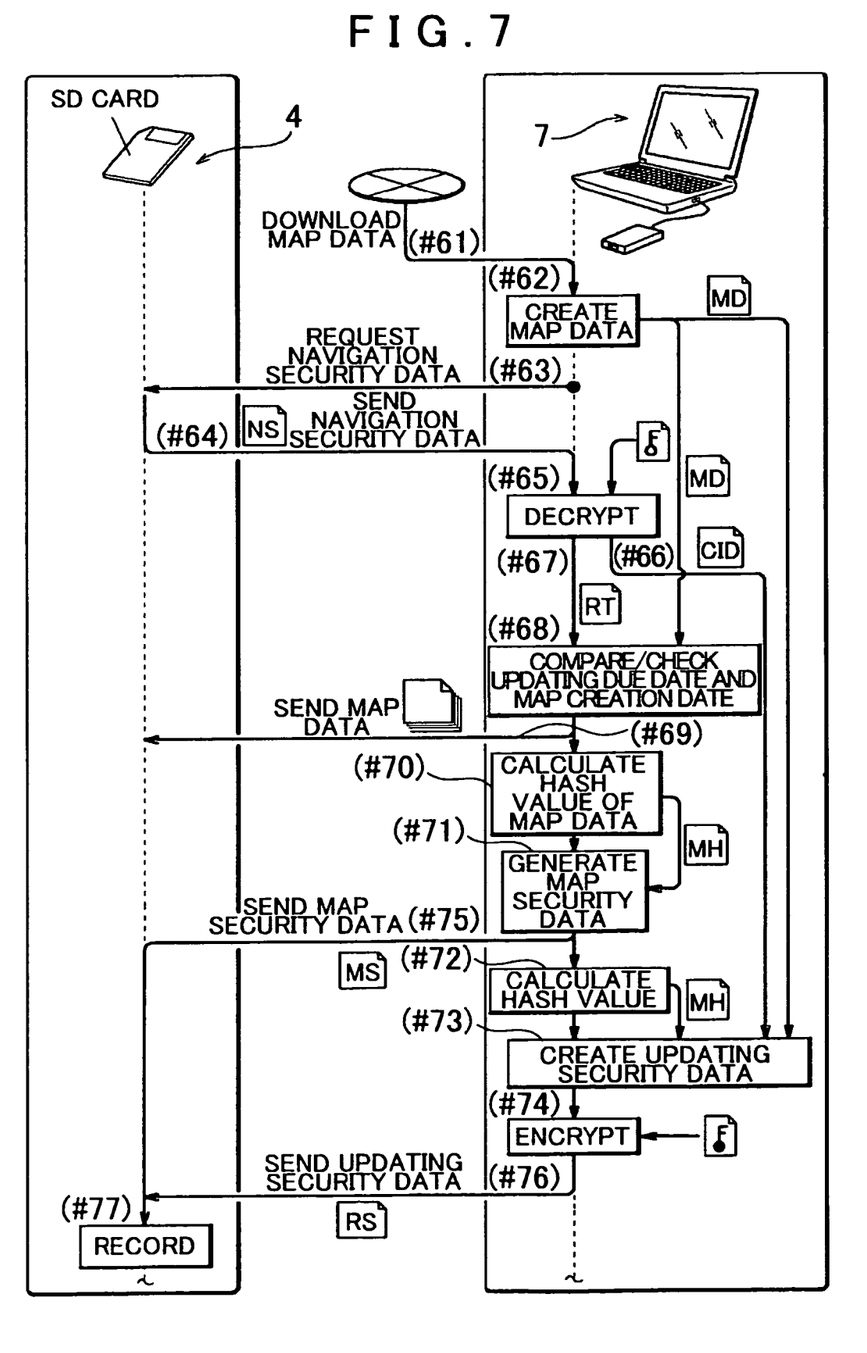
FIG. 7 is a diagram schematically illustrating data exchange between the SD card and the updating unit at the time of updating map data and FIG. 8 is a diagram schematically illustrating data exchange between the navi unit and the SD card at the time other than the first use.

Next, flows of data exchange between the SD card and the updating unit during updating of map data will be described using a diagram of FIG. 7.

First, the updating unit 7 downloads map data in advance (#61), and stores the downloaded data in the memory as map data for updating (#62). At this time, the map data before being updated exist in the updating unit 7. When the downloaded map data are difference data, the difference data are used here to update the existing map data to the latest data. In this state, when the SD card 4 as a target of update is inserted in the updating unit 7, the updating unit 7 requests the navigation security data which the SD card 4 received from the navi unit 1 and recorded (#63). The received navigation security data are stored temporarily in the memory (#64). The navigation security data are decrypted using the navigation decryption key (#65). The medium identification information (CM) is taken out from the navigation security data decrypted in this manner, and is temporarily stored in the memory of the updating unit 7 (#66). Moreover, the map updating due date is taken out from the decrypted navigation security data (#67) and compared with the creation date and time of the stored map data for updating so as to check whether the creation date and time have passed the map updating due date, or a check is made regarding the map updating due date depending on other set conditions (#68).

When the check regarding the map updating due date is passed, the map data for updating are sent to the SD card 4 (#69). In the updating unit 7, the hash calculating unit 75 calculates the hash value (MH) of the map data (#70). Normally, the map data has a large data volume and is structured in a divided manner. Thus, hash values of the respective map sub-data are calculated, and the map security data (MS) are generated (#71). Further, the hash values of the respective map sub-data included in the map security data (MS) are used together to perform a hash operation, thereby calculating an integrated hash value (#72). The updating security data generating unit 74 generates the updating security data (RS) by grouping the integrated hash value, the creation date of the map data, and the medium identification information taken out from the decrypted navigation security data, and the like (#73). The generated updating security data are encrypted with the update encryption key (#74). The encrypted updating security data are sent to the SD card 4 together with the previously generated map security data (#75, #76), and are recorded in the flash memory 44 as the data area of the SD card 4 (#77).

Figure 8:
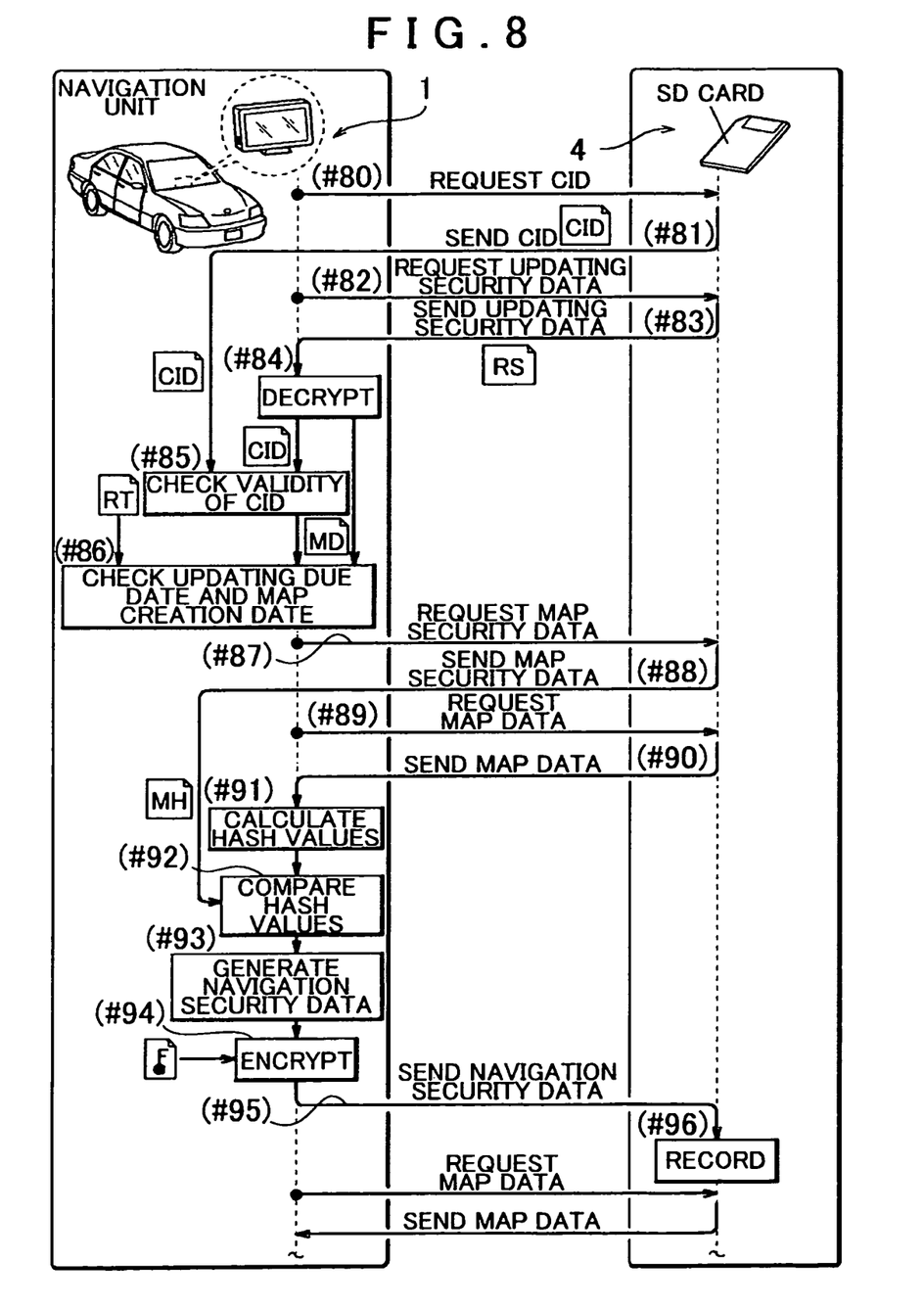

Next, flows of data exchange when the SD card 4, in which the initial map data are updated via the updating unit, is used in the navi unit 1 will be described using a diagram of FIG. 8.

When this SD card 4 is inserted first in the navi unit 1, the password lock function is released, and the updating right information is already deleted. When the SD card 4 is inserted in the navi unit 1, the navi unit 1 requests the medium identification information (CID) recorded in the management memory 42 as the management area from the SD card 4 (#80), and obtains the medium identification information recorded in the management memory 42 in the SD card 4 (#81). Further, the navi unit 1 requests the updating security data (RS) recorded in the flash memory 44 of the SD card 4 (#82), and obtains the updating security data (#83). The updating security data (RS) are decrypted using the update decryption key (#84). Since the updating security data include the medium identification information, matching between the SD card 4 and the map data updated in the updating unit 7 is checked by comparing this medium identification information with the previously obtained medium identification information (#85). When there is no problem in matching of the medium identification information, the map creation date (MD) included in the updating security data received currently is compared with the map updating due date recorded in the navigation unit 1, so as to check matching therebetween (#86). When there is no problem in this matching, the SD card 4 itself can be regarded as a valid one.

Next, in order to check the validity of the map data themselves (for example, to check whether the map data are not illegally copied) recorded in the SD card 4, first the map security data (RS) are requested from the SD card 4 (#87), and the map security data are received (#88). Further, the map data are requested (#89) and the map data are received (#90). The received map data, practically the hash values of the respective map sub-data sectioned by the predetermined section number are calculated by the hash calculating unit 27 (#91). Further, the hash calculation of the group of hash values obtained by this calculation is performed integrally so as to calculate an integrated hash value. This integrated hash value and the hash value included in the previously received map security data (the integrated hash value calculated by the updating unit 7) are compared with each other (#92). When the hash values match each other, it is assured that the map data downloaded and created in the updating unit 7 match the map data recorded in the SD card 4 inserted currently. Thus, the validity of the SD card 4 including the map data is recognized. Further, when the navigation security data include data with a value that changes as the vehicle is operated, such as the traveling distance, the navigation security data generating unit 25 generates navigation security data including latest data (#93). Thus, the initial processing is completed. When car navigation processing is performed, the SD management controller 1B accesses the SD card 4 in response to the request from the car navigation main unit 1 A to read the necessary map data from the SD card 4, and processing provided to the car navigation main unit 1A is repeated.

By including the structure as described above, map data updating with high security can be achieved. Specifically, the following patterns are conceivable.

(1) When there is an attempt to dead-copy the entire map data from a new SD card 4, the password lock function works and data access is permitted only with the dedicated navi unit 1. Therefore, such dead-copying of map data is not possible. After the password lock is released, the updating right data are deleted, and thus it is not possible to illegally obtain the updating right of map data (2) After the password lock function is released by inserting the SD card 4 in the navi unit 1, when there is an attempt to use another SD card 4 to which the aforementioned SD card 4 is dead-copied entirely, the illegal copy can be recognized from that the medium identification information of the navigation security data does not match the medium identification information (recorded in the management memory) inherent to the SD card, and use of the illegal copy can thereby be prohibited.

(3) When an SD card 4 in which part of the map data is modified or illegally copied is inserted, use of this SD card can be prohibited by calculating the hash value of the map data as described above when the navi unit 1 is activated, and comparing this calculation value with the hash value included in the navigation security data.

(4) When there is an attempt to perform map updating of an SD card 4 of which map updating due date has expired, by backdating the updating unit, the map updating due date included in the navigation security data is compared with the map creation date as an attribute value of the map data for updating to check matching therebetween, and the unauthorized clock setting of the updating unit can thereby be detected. Rewriting of the map updating due date of the navigation security data is impossible because the navigation security data are encrypted with the navigation encryption key. Further, when the navigation security data of another SD card 4 of which map updating due date has not expired yet are copied entirely, even if map updating is succeeded in the updating unit 7, the medium identification information of the navigation security data is written during this updating, and hence this unauthorized act can be detected in the navi unit 1 by comparing the medium identification information of the updating security data thereof with the medium identification information read from the management memory 42 of the SD card 4.

(5) When the program for this navigation system installed in the updating unit 7 is cracked, and the functional unit such as the above-described updating due date check is avoided by a patch, such an unauthorized act can be detected by comparing the map creation date included in the updating security data with the map updating due date by the navi unit. Vulnerability of the encryption system in this navigation system due to cracking of the program installed in the updating unit 7 is avoided by employing two different encryption key systems so that codes encrypted with the navigation encryption key of the navi unit 1 can only be decrypted with the navigation decryption key of the updating unit 7, and codes encrypted with the update encryption key of the updating unit 7 can only be decrypted with the update decryption key of the navi unit 1.

[Other Embodiments]

(1) In the above-described embodiment, the password lock function is employed for preventing data access to the SD card (one type of recording medium) 4 before the SD card 4 is used in the navi unit 1. However, it is possible to employ another lock function, particularly a lock function suitable for the recording medium to be used. Although the password lock function is released after the updating right information is deleted from the data area, a release of the password lock function before the deletion is not excluded from the scope of the present invention. Further, a navigation system in which the password lock function is removed is also within the scope of the present invention.

(2) When a certain degree of vulnerability can be tolerated, a system in which the updating right information read from the data area of the SD card (one type of recording medium) 4 is not recorded in the memory of the navi unit is possible also within the scope of the present invention.

(3) It is also possible in the scope of the present invention to omit recording of the medium identification information of the recording medium that is the first target of data access for the navi unit as the first-used medium identification information in the memory of the navi unit. Further, depending on the field of application, it is not always necessary that the recording medium having the medium identification information recorded as the first-used medium identification information has a different map updating due date from those of other recording media.

(4) In the above-described example, the navi unit designates a predetermined period from the time of reading the updating right information as the map updating due date with respect to this updating right information. However, a timing other than the time of reading the updating right information may also be employed as the timing as a starting point of the map updating due date. As this timing, for example, there is timing of inserting the recording medium in the navi unit, timing when the traveling distance of the vehicle exceeds a predetermined distance, timing when the recording medium in which map data are recorded is manufactured, or timing of shipping.

(5) By using hash values for detecting unexpected changes of the map data, the calculation load can be decreased more than by prevention of tampering such as encryption. However, for further decreasing the calculation load in the navi unit 1 and the updating unit 7, it is also possible to omit this tampering prevention using hash values.

(6) As an embodiment most suitable for strengthening the security, the two different encryption key systems are employed between the navi unit 1 and the updating unit 7. However, the present invention is not limited to this. Employing an encryption system with a single common key is also included in the present invention.

(7) In the above-described embodiment, the map data are constituted of the plurality of sub-data, and the map security processing data used for the updating security data are hash values calculated further from the plurality of hash values generated from the respective sub-data. However, without performing such a two-level hash calculation, one-level hash calculated data, that is, the map security data may be used as they are.

(8) Although the map creation date is employed as a unique attribute value of the map data for updating included in the updating security data, another unique attribute value such as a map creation history code may be employed.

(9) The capability of the CPU system incorporated in the SD card (one type of recording medium) 4 is increasing every year, and thus it is possible within the scope of the present invention to build on the SD card side the management function of update information, the hash calculation function, the encryption function, and so on that are built in the navi unit 1 and the updating unit 7 in the above-described navigation system.

The navigation system of the present invention may be applied not only to a car navigation system mounted in a vehicle but also to various navigation systems, such as a portable navigation system, in which updatable map data are recorded in an attachable/detachable recording medium and used.

The invention claimed is:

1. A navigation system having a navigation unit operating using map data and a recording medium attachable to and detachable from the navigation unit, in which the recording medium has a rewritable data area in which the map data are recorded and a non-rewritable management area in which medium identification information is recorded, the navigation system wherein
updating right information necessary for updating the map data is recorded in the data area, the updating right information including information related to a right of updating the map data recorded in the recording medium, and
the updating right information is read from the data area and deleted from the data area at a first data access to the recording medium by the navigation unit, and a map updating due date created based on the read updating right information is written in a memory of the navigation unit together with medium identification information read from the management area.

2. The navigation system according to claim 1, wherein the recording medium has a password lock function which is initially in a locked state, and the navigation unit includes a password for releasing the password lock so that the password is sendable to the recording medium.

3. The navigation system according to claim 2, wherein the password lock function is released after the updating right information is deleted from the data area.

4. The navigation system according to claim 1, wherein the updating right information read from the data area is recorded in the memory of the navigation unit.

5. The navigation system according to claim 1, wherein medium identification information of the recording medium that is subject to the first data access by the navigation unit is recorded in the memory of the navigation unit as first-used medium identification information, and the map updating due date differs between the recording medium having the medium identification information recorded as the first-used medium identification information and other recording media.

6. The navigation system according to claim 1, wherein the navigation unit designates a predetermined period from the time of reading the updating right information as the map updating due date for the updating right information.

7. The navigation system according to claim 1, wherein when the map data are updated, updating map data sent from an external unit are recorded in the data area of the recording medium, and a hash value generated from the updating map data is recorded as map security data in the recording medium.

* * * * *